United States Patent
Duffy et al.

(10) Patent No.: US 9,659,263 B2
(45) Date of Patent: May 23, 2017

(54) PROJECT MANAGEMENT NOTIFICATION AND UPDATES USING FAMILY TREE

(75) Inventors: Maureen Emily Duffy, Westford, MA (US); John Palmieri, Cambridge, MA (US)

(73) Assignee: Red Hat, Inc., Raleigh, NC (US)

( * ) Notice: Subject to any disclaimer, the term of this patent is extended or adjusted under 35 U.S.C. 154(b) by 727 days.

(21) Appl. No.: 12/327,722

(22) Filed: Dec. 3, 2008

(65) Prior Publication Data

US 2010/0134281 A1  Jun. 3, 2010

(51) Int. Cl.
*G08B 3/00* (2006.01)
*G08B 21/22* (2006.01)
*G06Q 10/06* (2012.01)
*G06F 9/44* (2006.01)

(52) U.S. Cl.
CPC .............. *G06Q 10/06* (2013.01); *G06F 8/71* (2013.01)

(58) Field of Classification Search
CPC combination set(s) only.
See application file for complete search history.

(56) References Cited

U.S. PATENT DOCUMENTS

| | | | |
|---|---|---|---|
| 7,275,095 B1 * | 9/2007 | Lebouill | 709/223 |
| 2007/0033080 A1 * | 2/2007 | Hochberg et al. | 705/7 |
| 2008/0079598 A1 * | 4/2008 | Bibelhausen et al. | 340/683 |
| 2008/0258881 A1 * | 10/2008 | Manson et al. | 340/286.14 |
| 2009/0033515 A1 * | 2/2009 | Cavanaugh | 340/825.49 |
| 2009/0276814 A1 * | 11/2009 | Tannenbaum | 725/86 |
| 2010/0117829 A1 * | 5/2010 | Mayer et al. | 340/540 |
| 2010/0217837 A1 * | 8/2010 | Ansari et al. | 709/218 |

* cited by examiner

*Primary Examiner* — Brian Zimmerman
*Assistant Examiner* — Cal Eustaquio
(74) *Attorney, Agent, or Firm* — Lowenstein Sandler LLP (57) ABSTRACT

A method and apparatus for automated project management notification using an update family tree. The system utilizes a set of subscription service managers and a set of message processing managers to automatically manage the inter-relationship between a set of systems belonging to different entities within the overall family tree of entities working on a project. Each subscription service manager tracks the other entities interested in the updates and events from the host of the subscription service manager. The message processing managers receive the update events from the subscription service manager and apply a set of host defined rules that govern the automated processing of the received messages. In turn, the entity hosting each message processing manager may have its own set of subscribers that are managed by their respective subscription service manager.

8 Claims, 4 Drawing Sheets

PROJECT MANAGEMENT NOTIFICATION AND UPDATES USING FAMILY TREE

TECHNICAL FIELD

Embodiments of the present invention relate to a method and system for providing automatic notification to a set of subscribers within an update tree. Specifically, the embodiments of the invention relate to a system and method for automatically cascading event notifications in the context of an update tree.

BACKGROUND

Typically, large scale project management includes multiple entities or groups that are working together on the project. Software development can involve a large scale project including the development of operating systems and business applications. When one group or entity that is participating in the project completes or updates the component or aspect of the project that it is responsible for, the entity or group notifies other participants of the updates through a web page, forum or email list. These communication channels are monitored by the interested parties.

An update is typically the release of a new package or version of the software component that is being produced by the group or entity. Receiving this update information is important to other groups or entities participating in the project, because they may need to incorporate the updated software component into their own version of the overall project or similarly modify their component to be compatible with the newest version of the software component by the other group or entity in the project that is making the update announcement. This in turn requires that each of the other entities or groups participating in the project provide their own update notifications for changes to their respective components or aspects of the over project.

Monitoring the status of each of the components in the overall packaging ensures that each of the participants is aware of the other updates created by the other participants. The monitoring process can be time and resource intensive and requires that each of the entities closely monitor the activities of the other entities and diligently work to address the changes required by the updates provided by the other groups and entities.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one

DETAILED DESCRIPTION

Described herein is a method and apparatus for automated project management notification using an update family tree. The system utilizes a set of subscription service managers and a set of message processing managers to automatically manage the inter-relationship between a set of systems belonging to different entities within the overall family tree of entities working on a project. Each subscription service manager tracks the other entities interested in the updates and events from the host of the subscription service manager. The message processing managers receive the update events from the subscription service manager and apply a set of host-defined rules that govern the automated processing of the received messages. In turn, the entity hosting each message processing manager may have its own set of subscribers that are managed by their respective subscription service manager. This inter-relation between servers provides the building blocks for creating any size of family tree that is scalable to manage any type of project.

Figure 1:
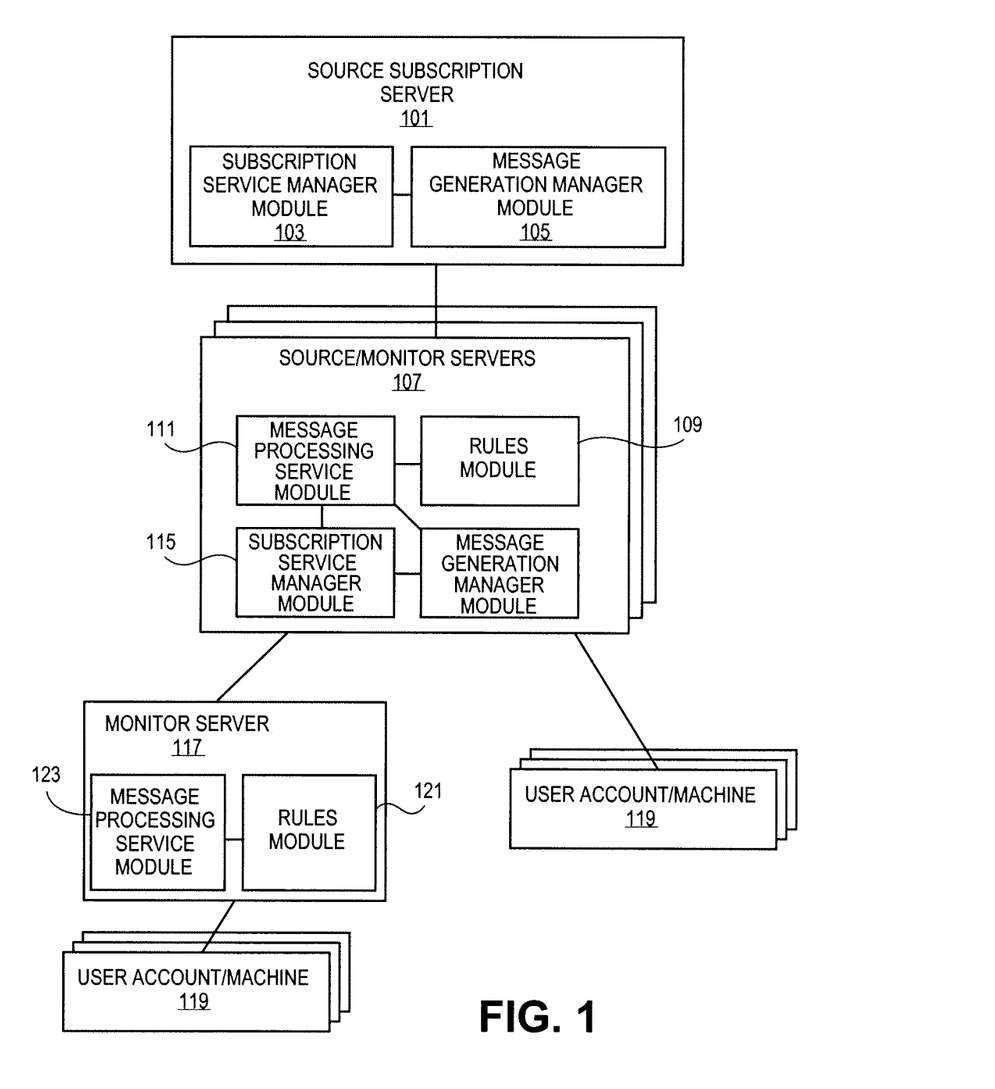
FIG. 1 is a diagram of one embodiment of an automated project management notification system.

FIG. 1 is a diagram of one embodiment of an automated project management notification system. In one embodiment, the automated project management notification system includes a set of source subscription servers 101, a set of source and monitor servers 107, a set of monitor servers 117 and a set of user accounts or machines 119. A 'set,' as used herein, refers to any positive whole number of items including one item. The source subscription servers 101, the source and monitor servers 107, the monitor servers 117 and the user machines 119 can be desktop computers, laptop computers, dedicated server computers, console devices, network devices or similar computing devices. Each of these devices can be interconnected through a network such a local area network (LAN), a wide area network (WAN), such as the Internet or similar network. A network can be composed of any number of computing and networking devices including both wired and wireless networking devices. The network of inter-related sources subscription servers 101, source and monitor servers 107, monitor servers 117 and user machines 119 can scale to encompass any number of machines.

A source subscription server 101 includes a subscription service manager module 103 and a message generator manager 105. The functions of each of these components can be combined into other types of modules or variations of the described modules. A subscription service manager module 103 receives registration requests or similar requests from a set of remote machines such as monitor servers 117, source and monitor servers 107 or user machines 119. Each machine can be registered as part of an account that can be configured by the respective account holder to indicate the types of events or messages of which the account holder would like to be notified. Similarly, the account holder can cancel the subscription or request that others machines or users be added to the subscription service. The subscription service manager module 103 can provide these functions and provide similar subscription service management functions.

The subscription service manager module 103 interacts with the message generation manager module 105 in response to an event being generated by the source subscription server 101. The subscription service manager module 103 provides a list of subscribers to the message generator 105 according to the parameters of an event so that the message generator manager 105 can generate a notification for each of the subscribers identified by the subscription service manager module 103.

The message generator 105 can create any type of notification including a electronic message using a simple mail transfer protocol (SMTP), simple messaging system (SMS) protocol, a web page update, proprietary network message or similar message sent by a networking protocol. A message generation manager module 105 can receive messages or event information from other applications local to or remote from the source subscription server 101. The message generation manager module 105 then queries the subscription service manager module 103 to obtain a list of subscribers for the type of message or event that the message generation manager module 105 has received. The message generation manager module 105 then formulates the message according to the types of protocols supported by the message generation manager module 105. The message generation manager module 105 sends each of the messages using the appropriate messaging protocols to each of the specified recipients. The message generation manager module 105 can send any number of messages to any number of recipients. Recipients can be source and monitor servers 107, monitor servers 117 or user machines 119.

Source subscription server 101 can host any number of subscription managers 103 and message generation manager modules 105. Separate subscription service manager modules 103 and message generation manager modules 105 can be utilized for each of the projects in which the host entity is involved. In another embodiment, the host entity uses separate source subscription servers 101 for each of their projects.

In one embodiment, the set of source and monitor servers 107 can be subscribed to any number of source subscription servers 101 to receive message notifications regarding specified types of events. Event types can include release events, security events, information events, announcement events, bug events, update events, such as project update events, component update events, documentation updates, release updates, bug patches, warnings and similar events and messages. The source and monitor servers 107 can include a message processing manager 111, a rules module 109, a subscription service manager module 115 and a message generation manager module 113. The functions of each of these components can be combined into other types of modules or variations of the described modules. One of ordinary skill in the art would understand that the functionality described in relation to each of these modules can be broken up into any number of individual modules or combined into a single monolithic module and that the configuration described herein is for the purpose of illustration and that the principles and the features of these modules can be utilized in other configurations.

A message processing manager 111 receives the messages and notifications from each message generation manager module 105 to which the source and monitor server 107 subscribes. The message processing manager 111 analyzes the incoming event or notification and queries a rules module 109 to determine any set of available defined rules for the type of message or event that has been received from the source subscription server 101. The message processing manager 111 can then execute those rules, interface with other modules that will execute these rules or similarly handle the incoming message or notification. For example, in the context of package management, the rules can define that upon receipt of a release update event from the source subscription server 101 the new release needs to be automatically downloaded from a location identified in the received release update event or notification. The rules could further define that the new release is to be utilized automatically in the latest build of a project or module tied to the host of the source and monitor server 107. The rules could further specify that a new event or notification should be generated by notifying the message generation manager module 113 of the newly rebuilt software component tied to the host of the source and monitor server 107.

Thus, in combination, the message processing manager 111, rules module 109, as well, as the subscription service manager module 115 and message generation manager module 113 form an intermediate link in the overall update family tree for the project management notification system. In contrast, the source subscription server 101, is essentially a root node whereas the source and monitor servers 107 are a set of intermediate links or branching nodes. A set of monitor servers 117 or user machines 119 can serve as a set of additional intermediate links or leaf nodes in the update family tree.

The rules module 109 can define a set of rules or instructions to be executed upon receipt of a corresponding event type or notification. These rules or instructions can be defined using any interpreted or compiled language. The rules module 109 can define any number of rules for any number of event types or notifications. These rules can be defined by the host of the source and monitor server 107. In another embodiment, some of the rules can be mandatory parts of the overall project management notification system.

The subscription service manager module 115 and message generation manager module 113 operate analogously to the corresponding components of the source subscription server 101. The subscription service manager module 115 manages the registration and maintenance of the subscription lists for each of the projects or services offered by the host of the source and monitor server 107. Subscribers can be other source and monitor servers 107, monitor services 117 and user machines 119. Similarly, the message generation manager module 113 generates and sends out the messages required for events received from upstream nodes such as a source subscription server 101, as well as, events and notification generated by the local source and monitor server 107 and its components. The message generation manager module 113 interacts with the subscription service manager module 115 to generate the appropriate messages to provide notification to the downstream computers or machines.

Monitor servers 117 are endpoints of the update family tree or links to user machines or user accounts 119. The monitor servers 117 include a message processing service module 123 and rules module 121. The message processing service module 123 and rules module 121 operate in a manner that is analogous to that of the equivalent components in the source and monitoring server 107. A monitor server 117 does not maintain a subscription list and is not responsible for generating additional messages as it is an endpoint in the service. A monitor server 117 provides access to event information to individual user accounts in a manner that is analogous to that of the source of monitor server 107. User accounts can be tied to e-mail, web-based forums, or similar resources that can be tied or restricted to individual user accounts maintained by the host of the monitor server 117. Information and notification information received by the monitor server 117 can be restricted by user account privileges or similar criteria. The message processing service module 123 can implement any rules defined by the monitor server 117 in the rules module 121.

A user machine 119 or account, can be a personal computer or account within a network domain. A set of privileges can be tied to the account 119 for a specific user. The user account and/or machine 119 can be tied to specific resources such as email accounts, forums, documents, software packages and similar resources. A user machine 119 or account can be used to define any set of rules that can be an automated response to a received update event or notification that is received from a monitor server 117. The user machine 119 or account can provide a user interface for a user to view received event information.

The network of source subscription servers 101, source and monitor servers 107, monitor servers 117 and user accounts and machines 119 is an example simplified presentation of the update family tree. One of ordinary skill in the art would understand that an update family tree can have any depth or number of nodes and can be utilized with any combination of the described set of components and modules to manage a project. Similarly, any number of projects can be managed by individual trees that overlap in terms of the underlying servers and machines that are executing the separate instances of the update family tree or nodes in the tree.

Figure 2:
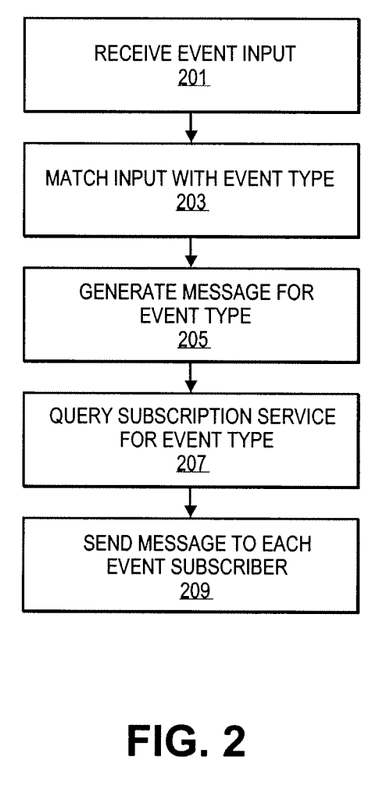
FIG. 2 is a flowchart of one embodiment of a process for initial event notification.

FIG. 2 is a flowchart of one embodiment of the event generation process. In one embodiment, the event generation process is initiated in response to a message generation manager module receiving an event input (Block 201). An event input can be manually input or a detected input in the host system. Manually-detected input can come in the form of a defined message generated by a user of the host system through a local or remote application. The input can also be generated by automated processes of local and remote applications. The host system can be a source subscription server or source and manager server.

The message generation manager module can match the event input with an event type (Block 203). The event types can be strictly defined or loosely defined by the overall automated project management notification system. The event type is then utilized to generate an appropriate message format or include specific content for a message to be generated (Block 205). For example, a release event type can be input with a release version number, and address or a link to the location of the release or associated package and similar information related to the new software package release. The release version and the package information that is input can be matched with a release event type, which then generates a message in a specific format that includes the provided data specifying the release version, software package location, as well as, other similar data related to the release.

The message generator 105 then performs a query on the subscription service manager module to obtain a list of subscribers for the specified or determined event type (Block 207). In some embodiments, more than one event type can correspond to a specific event input in which case a list of each of the subscribers for each of the event types can be obtained and utilized or in some embodiments, a user or administrator is prompted to specify, which of a set of corresponding events are to be the basis for message or notification generation. Once the subscription list has been obtained, a copy of the message is then generated and sent to each entry in the list of subscribers (Block 209). The generation of messages can be done as a batch job or can be iteratively generated depending on the bandwidth and the resources available to the host system.

Figure 3:
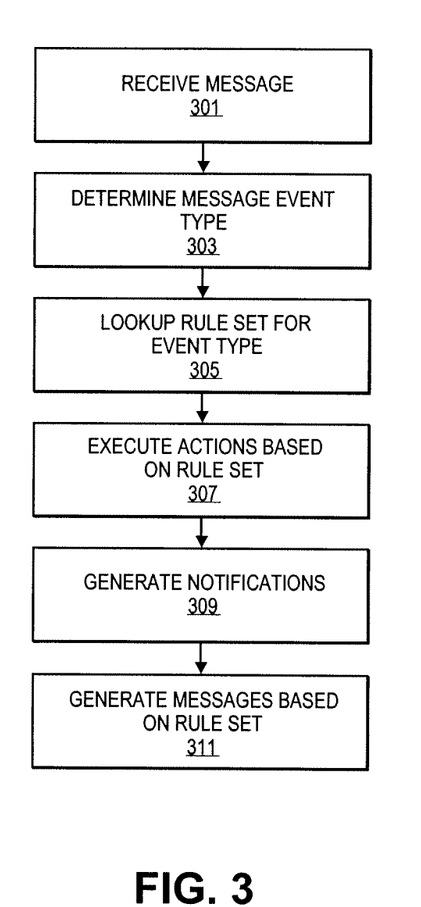
FIG. 3 is a flowchart of one embodiment of an automated notification handling process.

FIG. 3 is a flowchart of one embodiment of a process for message processing. In one embodiment, the message processing is carried out by the message processing service module in response to receiving a message from an upstream source subscription server or source and monitor server (Block 301). The message that is received can have any format or even multiple formats depending on the networking and messaging system utilized by the overall project management notification system. The format and protocols used can be tied to the type of event or notification.

The message processing service module analyzes the received message to determine the event type of the message (Block 303). The event type can be specifically specified in the format of the message or can be inherent in the format of the message. A message processing service module then performs a look up for the event type to determine any corresponding rule set that might be specified within a rules module (Block 305). In addition, a set of default rules can be applicable to any event type. Default rules may include the generation of new messages or events as part of the further cascading messaging of the event type to subscribers of the host of the message processing service module or similar actions.

The set of specified rules, actions and default actions are then executed by the host system in the form of the message processing service module, rule module, subscription service manager module, message generation manager module and similar components (Block 307). The executed rules can provide notification to other components of the system or the execution of the actions themselves. These actions can include the generation of new notices, the generation of new software packages or builds, the update of databases, notification of user accounts, the update of web pages or other forms of community resources or similar actions Specifically, users are ultimately provided notification of the incoming event type (Block 309) so they can take appropriate action to incorporate the new information into the project associated with the host receiving the message.

In addition, the list of subscribers can be notified of the event type or the result of the event such as an update of the package or build of a software project that is managed by the host of the message processing service module that is a direct result of the received event. Messages of the same event type are sent to the downstream nodes that are subscribers for the event type (Block 311). The list of subscribers is obtained by querying the local subscription service manager module.

Figure 4:
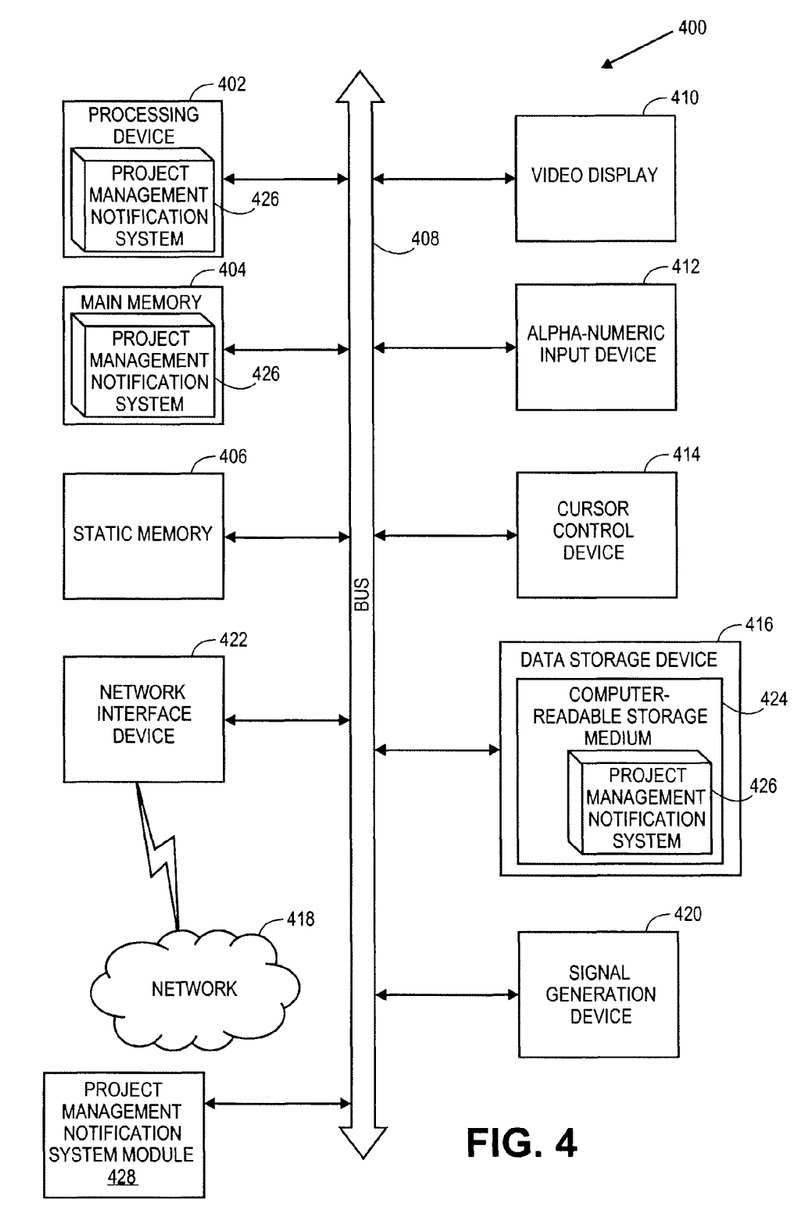
FIG. 4 is one embodiment of a computer system for project management notification.

FIG. 4 is a diagram of one embodiment of a computer system for desktop management. Within the computer system 400 is a set of instructions for causing the machine to perform any one or more of the methodologies discussed herein. In alternative embodiments, the machine may be connected (e.g., networked) to other machines in a LAN, an intranet, an extranet, or the Internet. The machine may operate in the capacity of a server or a client machine (e.g., a client computer being the monitor server and the server computer being the source and monitor server) in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a secondary memory 416 (e.g., a data storage device in the form of a drive unit, which may include fixed or removable computer-readable medium), which communicate with each other via a bus 408.

The processing device 402 represents one or more general-purpose processing devices such as a microprocessor, central processing unit, or the like. More particularly, the processing device 402 may be a complex instruction set computing (CISC) microprocessor, reduced instruction set computing (RISC) microprocessor, very long instruction word (VLIW) microprocessor, processing device implementing other instruction sets, or processors implementing a combination of instruction sets. Processor 702 may also be one or more special-purpose processing devices such as an application specific integrated circuit (ASIC), a field programmable gate array (FPGA), a digital signal processor (DSP), network processor, or the like. Processor 402 is configured to execute the project management notification system 426 for performing the operations and steps discussed herein.

The computer system 400 may further include a network interface device 422. The computer system 400 also may include a video display unit 410 (e.g., a liquid crystal display (LCD) or a cathode ray tube (CRT)) connected to the computer system through a graphics port and graphics chipset, an alphanumeric input device 412 (e.g., a keyboard), a cursor control device 414 (e.g., a mouse), and a signal generation device 420 (e.g., a speaker). The secondary memory 416 may include a machine-readable storage medium (or more specifically a computer-readable storage medium) 424 on which is stored one or more sets of instructions (e.g., the project management notification system 426) embodying any one or more of the methodologies or functions described herein. The project management notification system 426 may also reside, completely or at least partially, within the main memory 404 and/or within the processing device 402 during execution thereof by the computer system 400, the main memory 404 and the processing device 402 also constituting computer-readable storage media. The project management notification system 426 may further be transmitted or received over a network 418 via the network interface device 422.

The computer-readable storage medium 424 may also be used to store the project management notification system 426 persistently. While the computer-readable storage medium 426 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

The modules 428, components and other features described herein (for example in relation to FIG. 1) can be implemented as discrete hardware components or integrated in the functionality of hardware components such as ASICS, FPGAs, DSPs or similar devices. In addition, the modules 428 can be implemented as firmware or functional circuitry within hardware devices. Further, the modules 428 can be implemented in any combination hardware devices and software components.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention. It should be noted that different references to "an" or "one" embodiment in this disclosure are not necessarily to the same embodiment, and such references mean at least one Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "generating," "querying," "sending," "looking up," "executing," "applying" or the like, refer to the actions and processes of a computer system, or similar electronic computing device that manipulates and transforms data represented as physical (electronic) quantities within the computer system's registers and memories into other data similarly represented as physical quantities within the computer system memories, registers or other such information storage, transmission or display devices.

The present invention also relates to an apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, Flash memory devices including universal serial bus (USB) storage devices (e.g., USB key devices) or any type of media suitable for storing electronic instructions, each of which may be coupled to a computer system bus.

The algorithms and displays presented herein are not inherently related to any particular computer or other apparatus. Various general purpose systems may be used with programs in accordance with the teachings herein or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A computer readable medium includes any mechanism for storing information in a form readable by a computer. For example, a computer readable medium includes read only memory ("ROM"), random access memory ("RAM"), magnetic disk storage media; optical storage media, flash memory devices or other type of machine-accessible storage media.

Thus, a method and apparatus for automated project management notification has been described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

The invention claimed is:

1. A method of notifying machines about software updates, the method comprising:
   identifying, by a processing device, a plurality of projects;
   identifying, by the processing device, a plurality of machines;
   identifying, by the processing device, a plurality of hierarchical trees comprising a first hierarchical tree and a second hierarchical tree, wherein each of the plurality of hierarchical trees is associated with a respective project of the plurality of projects, and wherein each of the plurality of hierarchical trees comprises a respective plurality of nodes, and wherein each node of the respective plurality of nodes corresponds to a respective machine in the plurality of machines, and wherein a first machine of the plurality of machines corresponds to both a first node of the first hierarchical tree and a second node of the second hierarchical tree;
   receiving a first notification of a first event input that is associated with a first software update;
   identifying a rule in view of a type of the first software update;
   applying the rule to the first notification;
   selecting by the processing device, in view of the first event input, a first project of the plurality of projects;
   selecting a first message format in view of the first software update, the first event input, and the first project;
   generating, in view of the first software update, the first event input, and the first project, a first message that has the first message format;
   sending the first message to machines corresponding to nodes of the first hierarchical tree, wherein the sending of the first message propagates the first message from a machine corresponding to the root node of the first hierarchical tree to machines corresponding to leaf nodes of the first hierarchical tree;
   receiving a second notification of a second event input that is associated with a second software update;
   selecting by the processing device, in view of the second event input, a second project of the plurality of projects;
   selecting a second message format in view of the second software update, the second event input, and the second project;
   generating, in view of the second software update, the second event input, and the second project, a second message that has the second message format; and
   sending the second message to machines corresponding to nodes of the second hierarchical tree, wherein the sending of the second message propagates the second message from a machine corresponding to the root node of the second hierarchical tree to machines corresponding to leaf nodes of the second hierarchical tree.

2. The method of claim 1, wherein the type of the first software update comprises at least one of a software release update, a software security update, a software information update, a software announcement update, or a software bug update.

3. The method of claim 1, further comprising:
   submitting a query to a subscription service manager to obtain a subscriber list.

4. A system for notifying machines about software updates, the system comprising:
   a network interface device; and
   a processing device, operatively coupled to the network interface device, to:
      identify a plurality of projects;
      identify a plurality of machines;
      identify a plurality of hierarchical trees comprising a first hierarchical tree and a second hierarchical tree, wherein each of the plurality of hierarchical trees is associated with a respective project of the plurality of projects, and wherein each of the plurality of hierarchical trees comprises a respective plurality of nodes, and wherein each node of the respective plurality of nodes corresponds to a respective machine in the plurality of machines, and wherein a first machine of the plurality of machines corresponds to both a first node of the first hierarchical tree and a second node of the second hierarchical tree;
      receive a first notification of a first event input that is associated with a first software update;
      identify a rule in view of a type of the first software update;
      apply the rule to the first notification;
      select, in view of the first event input, a first project of the plurality of projects;
      select a first message format in view of the first software update, the first event input, and the first project;
      generate, in view of the first software update, the first event input, and the first project, a first message that has the first message format; and
      send, via the network interface device, the first message to machines corresponding to nodes of the first hierarchical tree, wherein the sending of the first message propagates the first message from a machine corresponding to the root node of the first hierarchical tree to machines corresponding to leaf nodes of the first hierarchical tree;
      receive a second notification of a second event input that is associated with a second software update;
      select, in view of the second event input, a second project of the plurality of projects;
      select a second message format in view of the second software update, the second event input, and the second project;
      generate, in view of the second software update, the second event input, and the second project, a second message that has the second message format; and
      send, via the network interface device, the second message to machines corresponding to nodes of the second hierarchical tree, wherein the sending of the second message propagates the second message from a machine corresponding to the root node of the second hierarchical tree to machines corresponding to leaf nodes of the second hierarchical tree.

5. The system of claim 4, wherein the processing device is further to submit a query to a subscription service manager to obtain a list of subscribers for the second software update.

6. A non-transitory computer-readable storage medium for notifying machines about software updates, the non-transitory computer-readable storage medium comprising instructions that, when executed by a processing device, cause the processing device to:

identify, by the processing device, a plurality of projects;
    identify, by the processing device, a plurality of machines;
    identify, by the processing device, a plurality of hierarchical trees comprising a first hierarchical tree and a second hierarchical tree, wherein each of the plurality of hierarchical trees is associated with a respective project of the plurality of projects, and wherein each of the plurality of hierarchical trees comprises a respective plurality of nodes, and wherein each node of the respective plurality of nodes corresponds to a respective machine in the plurality of machines, and wherein a first machine of the plurality of machines corresponds to both a first node of the first hierarchical tree and a second node of the second hierarchical tree;
    receive a first notification of a first event input that is associated with a first software update;
    identify a rule in view of a type of the first software update;
    apply the rule to the first notification;
    select by the processing device, in view of the first event input, a first project of a plurality of projects;
    select a first message format in view of the first software update, the first event input, and the first project;
    generate, in view of the first software update, the first event input, and the first project, a first message that has the first message format;
    send the first message to machines corresponding to nodes of the first hierarchical tree, wherein the sending of the first message propagates the first message from a machine corresponding to the root node of the first hierarchical tree to machines corresponding to leaf nodes of the first hierarchical tree;
    receive a second notification of a second event input that is associated with a second software update;
    select by the processing device, in view of the second event input, a second project of the plurality of projects;
    select a second message format in view of the second software update, the second event input, and the second project;
    generate, in view of the second software update, the second event input, and the second project, a second message that has the second message format; and
    send the second message to machines corresponding to nodes of the second hierarchical tree, wherein the sending of the second message propagates the second message from a machine corresponding to the root node of the second hierarchical tree to machines corresponding to leaf nodes of the second hierarchical tree.

7. The non-transitory computer-readable storage medium of claim 6, wherein the instructions further cause the processing device to submit a query to a subscription service manager to obtain a list of subscribers for the first software update.

8. The non-transitory computer-readable storage medium of claim 6, wherein the type of the first software update comprises at least one of a software release update, a software security update, a software information update, a software announcement update, or a software bug update.

\* \* \* \* \*